Figure 1:
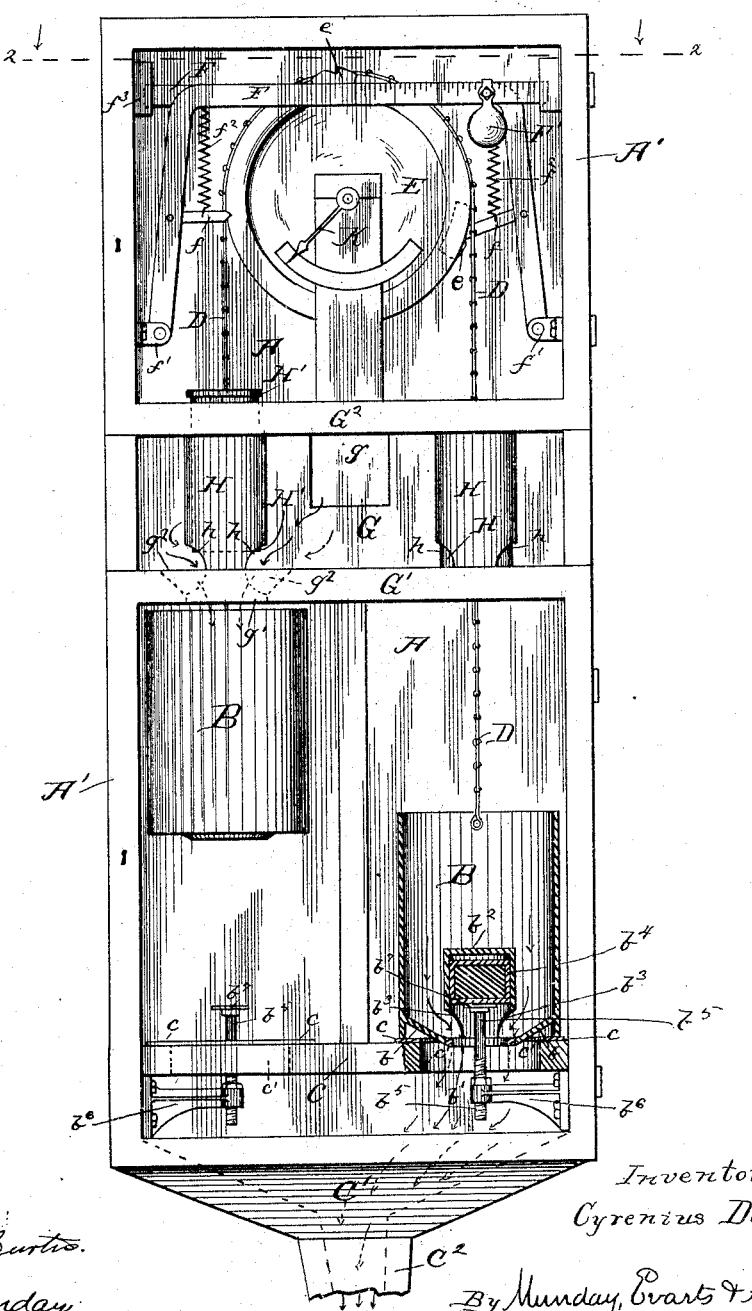

(No Model.) 2 Sheets—Sheet 1.

C. DOMINY.
AUTOMATIC GRAIN WEIGHING SCALE.

No. 353,353. Patented Nov. 30, 1886.

Witnesses:
Lew. E. Curtis.
D. W. Munday

Inventor:
Cyrenius Dominy
By Munday, Evarts & Adcock
his Attorneys (No Model.)
2 Sheets—Sheet 2.

C. DOMINY.
AUTOMATIC GRAIN WEIGHING SCALE.

No. 353,353. Patented Nov. 30, 1886.

Witnesses:
Lew. E. Curtis.
H. W. Munday.

Inventor:
Cyrenius Dominy
By Munday, Evarts & Adcock
his Attorneys.

UNITED STATES PATENT OFFICE.

CYRENIUS DOMINY, OF ENGLEWOOD, ILLINOIS.

AUTOMATIC GRAIN-WEIGHING SCALE.

SPECIFICATION forming part of Letters Patent No. 353,353, dated November 30, 1886.

Application filed July 20, 1886. Serial No. 208,515. (No model.)

*To all whom it may concern:*

Be it known that I, CYRENIUS DOMINY, a citizen of the United States, residing in Englewood, in the county of Cook and State of Illinois, have invented a new and useful Improvement in Automatic Grain-Weighing Scales, of which the following is a specification.

My invention relates to improvements in automatic scales for weighing grain or other similar articles as discharged from an elevator or other spout.

The object of my invention is to provide an efficient and accurate device, of a simple, cheap, and durable construction, for automatically weighing grain in bulk or other like articles as the same are discharged from the spout of an elevator, thrashing or other machine, or being transferred from one place to another.

In weighing-machines of this class heretofore in use considerable difficulty has been experienced in their practical operation from grains or other small particles getting in between the meeting or working surfaces of the valves of the grain-weighing buckets, and thus interfering with their operation, and heretofore the construction of these machines has generally been quite complicated and expensive.

In my invention the construction of the valves is such as to preclude the possibility of their operation being interfered with by particles of grain getting in between their working-surfaces—a result which I accomplish, and herein one feature of my invention consists, by means of a vertically-moving valve-piston working in a top-closed open-bottomed case or shell having side openings at or near its base for the admission or discharge of the grain.

Another feature of my invention consists in the means I employ for operating my valve-piston in one direction by its own weight or gravity and in the opposite direction by the up-and-down movement of the grain-weighing bucket or its chain.

Another feature of my invention consists in the means I employ for automatically releasing the grain-buckets by the movement of the scale-beam itself so soon as the bucket receives the predetermined weight of grain—that is to say, in connection with a pair of weighing buckets or vessels, and a chain or line for supporting them passing over a sprocket-wheel or pulley. It consists in a pair of weighing-beams furnished with pawls engaging notches or teeth in said wheel or pulley, thereby locking each grain-bucket in turn from movement until it receives a sufficient weight of grain to raise or move the scale-beam, and thus release the wheel or pulley and permit the grain-bucket to descend and discharge its load. In my invention one bucket is being filled while the other is being discharged. A vibrating arm is connected with the pulley or wheel for operating any ordinary counting or registering device to register the number of weights.

My invention also consists in the novel devices and novel combinations of devices herein shown and described, and more particularly pointed out in the claims.

Figure 2:
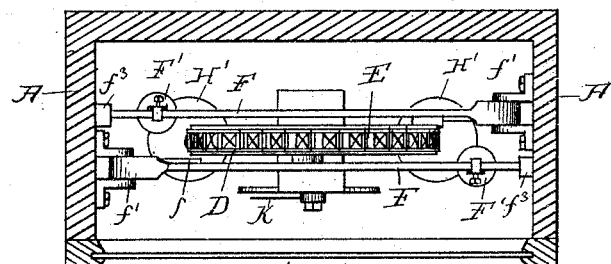
Figure 3:
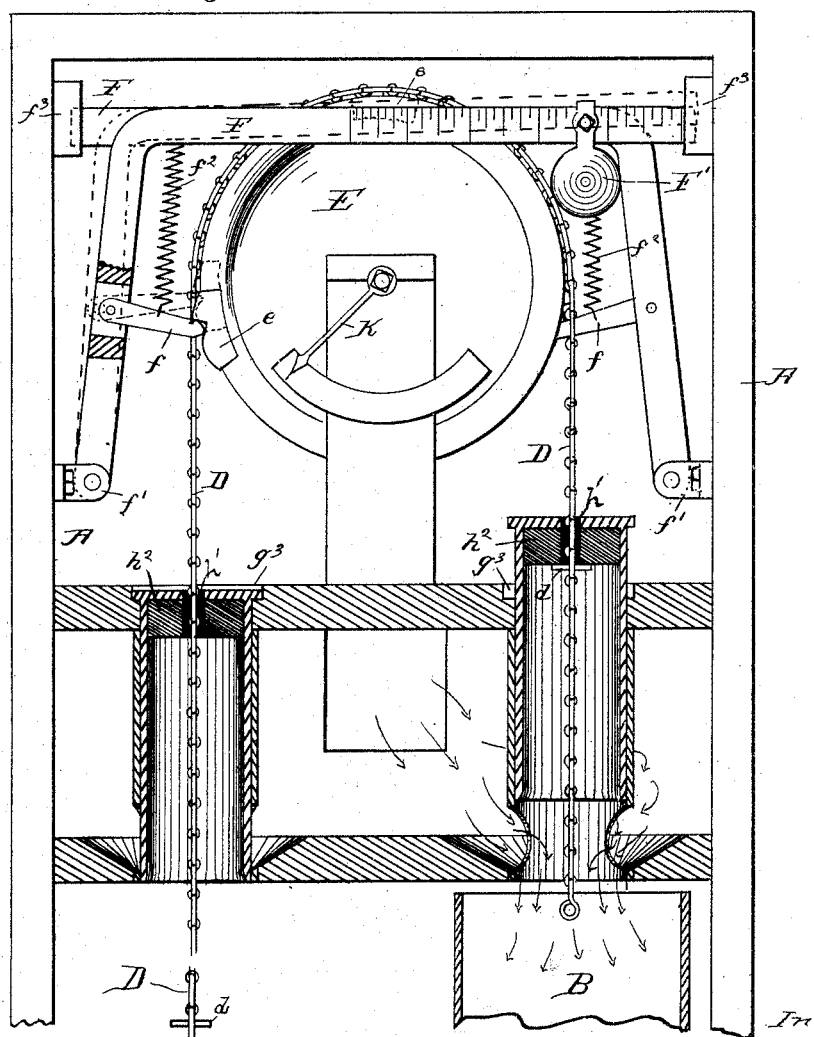

In the accompanying drawings, which form a part of this application, and in which similar letters of reference indicate like parts, Figure 1 is a front elevation of a device embodying my invention, showing one of the buckets in section. Fig. 2 is a horizontal section on line 2 2 of Fig. 1, and Fig. 3 is an enlarged sectional view of the filling-valves.

In said drawings, A represents the case or frame of the machine, the front face of which may preferably be of glass, mounted on a hinged door-frame, A'.

B B are the grain-weighing buckets or vessels, preferably of a cylindrical shape, having inclined or funnel-shaped bottoms $b$, with a central opening, $b'$, therein, and provided with an inverted cup-shaped valve case or shell, $b^2$, rigidly secured thereto and covering said central opening, $b'$. The open-bottomed top-closed vertical valve-case $b^2$ is furnished with openings $b^3$ at or near its base, through which the grain is discharged from the bucket. The openings $b^3$ are closed by the valve-piston $b^4$, which works up and down in its top-closed case $b^2$. This piston operates by its own gravity to close the valve-openings whenever the bucket is raised from its discharging-point, and is preferably made hollow and loaded with some heavy metal—as lead, for example. The valve is automatically opened when the bucket is lowered to its discharging-point by an adjustable fixed stop, $b^5$, preferably screw-threaded and secured to a bracket, $b^6$, secured to the case or frame of the machine.

C is the base or platform upon which the buckets rest while the grain is being discharged therefrom. To prevent too much shock or jar when the bucket strikes this platform, I provide the same with rubber cushions $c$. For the same purpose the flat heads of the stops $b^5$ should be furnished with yielding cushions $b^7$. The grain is discharged through openings $c'$ in the platform C, and thence by the inclined or hopper-shaped base C' out through the common discharge-spout, $C^2$.

D is the line, preferably a sprocket-wheel chain, running over the pulley E, and by which the grain-buckets are supported, one at each end, and F F are the weighing-beams. The shaft or axle of the wheel E is journaled in suitable bearings on the frame of the machine, and said wheel is furnished with the usual teeth to engage the chain D.

G is the grain hopper or receptacle, into which the grain is delivered through the opening $g$ from the spout of the elevator or other machine, and from which the grain is delivered into the weighing-buckets B B through the openings $g'$ $g'$ in the floor or bottom G' of this receptacle.

H H are cylindrical valve shells or cases fitted over these openings $g'$ $g'$, and extending to the upper wall or top, $G^2$, of the grain-receptacle G. These valve-shells are furnished with side openings, $h$, near their base for the admission of the grain, and the bottom G' of the grain-receptacle is made funnel-shaped or flaring, as shown at $g^2$, around the valve-shells H.

H' H' are the valve-pistons, which close the valve ports or openings in the shells H H and work up and down inside the same.

The chain D passes through openings $h'$ in the valve-pistons H' H', and the chain is furnished with stops or projections $d$ $d$, which serve to raise the valve-piston and open the valve-ports when the bucket B is raised to its filling position, as indicated in Figs. 1 and 3. The valve-piston moves in the opposite direction to close the valve ports by its own gravity, and each of them should be provided with a weight, as $h^2$, for this purpose. The top $G^2$ of the grain-receptacle is provided with holes $g^3$, through which the valve-pistons H' H' project or move when the same are raised, as indicated in Fig. 3. The valve-shells H H being extended up to the top of the hopper G effectually excludes grain from getting in between the working-surfaces of the valves. By the extension of the valve-shells H H above the level of the grain, though these shells in a sense have open tops, still the shells are closed to the admission of the grain at their tops the same as if their tops were closed over in the manner shown in relation to the valve-shells $b^2$ $b^2$. The closing of the valve-shells H H by their upward extension I therefore regard as an equivalent construction to that of the valve-shells $b^2$ $b^2$. It is, however, I believe, a better as well as more convenient construction for the valves H H H' H', though the principle and mode of operation are the same.

The weighing-beams F F are each furnished with a pawl, $f$, which engages a notch or projection, $e$, on the wheel E, and serves to hold said wheel from turning until the grain in the bucket is sufficiently heavy to raise the scale-beam. Each of the scale-beams is made, or is preferably made, of a bent form, about as indicated in the drawings, and is pivoted at its lower end to a bracket, $f'$, secured to the frame of the machine at a point somewhat below the wheel E. By making the scale-beam in a bent form, as indicated, I am enabled to keep the scale-beam proper in a horizontal position, and at the same time locate the pawls $f f$ on opposite sides of the wheel E diametrically opposite each other, so that a slight turning of the wheel in either direction by the weight of the grain-bucket and the grain therein will operate to raise the scale-beam and release the pawl $f$ from the notch in the wheel. The pawls $f f$ are pivoted to the scale-beams, and are each provided with springs $f^2$, for retaining them in position to engage the notches $e$ on the wheel E as the wheel turns from one position to the other. The free ends of the scale-beams F F play up and down in guides or guards $f^3$, which are fitted to the frame of the machine.

K represents an arm or pointer secured to the shaft of the wheel E, for operating the registering or counting device by which the number of weights is registered. As any ordinary registering or counting device may be employed now usually found in the market, and as their construction and mode of application are well known and do not constitute part of my present invention, I have not deemed it necessary to herein show or describe the same. I have therefore simply indicated the moving part of my weighing-machine, to which I contemplate applying the registering device.

F' F' represent the counterpoises on the weighing-beams.

The grain-bucket B may be made of any suitable size; ordinarily, however, I deem it preferable that they should contain a unit-measure, as a bushel or some multiple thereof.

In operation, the counterpoises are each set on the scale-beam at the point necessary to weigh, say, one bushel of the article being weighed, or sixty pounds if it is wheat, for example. The grain is discharged into the grain-receptacle G through the opening $g$ from the spout of the elevator, corn-sheller, or other machine. One of the buckets B, as illustrated in Fig. 1, the right-hand one, rests upon the support $c$, while the left-hand bucket B is elevated to the filling position and held there by the pawl $f$ of the right-hand weighing-beam and the counterpoise on said beam. The grain fills the left-hand bucket B until sixty pounds, or the amount necessary to raise the scale-beam, is received, when said left-hand bucket begins to descend, thus closing the left-hand valve H, the valve-piston H' descending by its gravity. As the left bucket B descends the valve in its bottom is opened by coming in contact with its stop $b^5$ and the grain discharged. The descent of the left-hand bucket B simultaneously raises the right-hand bucket B to its filling position, thus opening the right-hand valve H, the valve in the right bucket closing as said bucket is raised by the gravity of its piston $b$. While the left-hand bucket is being discharged through the bucket-valve, the right-hand bucket is being filled through its filling-valve, and this operation is indefinitely repeated as long as the grain is supplied to the grain-receptacle G. The weight of the filled bucket, it will of course be understood, operating on the wheel E, tends to turn the wheel E, while on the other hand such tendency is opposed by the counterpoise-weight through the pawl $f$. The moment the weight in the grain-bucket, however, is sufficient to slightly turn the wheel E the pawl is raised past the central line, as indicated in Fig. 3 in the dotted lines, and it then ceases to oppose the further descent of the grain-bucket.

It will be understood that the relative diameters of the pulley E, or the portion thereof upon which the chain runs, and of the rim upon which the notches $e\ e$ are made, may be varied to give the requisite power to the counterpoise-weight; or the size of the counterpoise or proportions of the scale-beams may be changed for this purpose. The notches or projections $e\ e$ may of course also be made upon separate wheels or projections on the shaft of the pulley E, instead of being formed upon said wheel E itself, as shown, and other like mechanical variations may of course be made, if desired, without departing from my invention.

The spout-opening $g$, through which the grain is delivered into the hopper G, is located between the filling-valves H H, and the ports or openings $h\ h$ being near the bottom of the grain-receptacle, and to one side of the delivery-opening $g$, the falling grain from the delivery-spout loses its momentum by striking against the bottom of the hopper G or the mass of grain therein. In this way the grain flows into the buckets B B from the bottom of the hopper, and sidewise through the filling-ports $h\ h$, so that the buckets are entirely unaffected by the momentum of the grain from the delivery-spout, which would interfere with accurate weighing.

I claim—

1. In an automatic weighing-machine, the combination, with a wheel or pulley, of a pair of grain-weighing buckets suspended by a line or chain passing over said pulley, and a pair of scale-beams furnished with pawls adapted to oppose the motion of said wheel until said scale-beams are raised, substantially as specified.

2. The combination of weighing-buckets B B with line or chain D, pulley E, furnished with notches $e\ e$, and bent scale-beams F F, having pawls $f\ f$, substantially as specified.

3. The combination of weighing-buckets B B with chain D, sprocket-wheel E, having notches $e\ e$, one on each side face, bent scale-beams F F, pivoted at their lower ends to the frame of the machine and arranged one on each side of said wheel E, guards $f^2\ f^2$ for the free ends of said scale-beams, and pawls $f\ f$, pivoted to said scale-beams, substantially as specified.

4. The combination of weighing-buckets B B with line or chain D, pulley E, furnished with notches $e\ e$, bent scale-beams F F, having pawls $f\ f$, and register-operating arm K, secured to the shaft of said pulley E, substantially as specified.

5. In an automatic weighing-machine, the weighing-bucket B, furnished with an open-bottomed top-closed vertical valve shell or case having side openings near its base, and a vertically-moving piston inside said shell for opening and closing the openings in said shell, whereby the working parts of the valve are kept free from interference, substantially as specified.

6. In an automatic weighing-machine, the combination, with a weighing-bucket, B, furnished with an open-bottom top-closed valve shell or case having side openings near its base, of a valve-piston inside said shell, and a fixed stop for moving said valve-piston by the movement of said bucket, substantially as specified.

7. The combination of a weighing-bucket, B, with open-bottom top-closed valve-shell $b^2$, having side openings, $b^3$, loaded valve-piston $b^4$, and adjustable fixed stop $b^5$, substantially as specified.

8. The combination of weighing-bucket B with open-bottom top-closed valve-shell $b^2$, having side openings, $b^3$, loaded valve-piston $b^4$, and adjustable fixed stop $b^5$, furnished with yielding cushion $b^6$, substantially as specified.

9. The combination, with a pair of vertically-moving weighing-buckets and a chain for operating said buckets, of a pair of filling-valves arranged above said buckets, and each consisting of a valve shell or case having side openings near its base, and a valve-piston working in said shell, substantially as specified.

10. The combination, with a pair of vertically-moving weighing-buckets and a chain for operating said buckets, of a pair of filling-valves arranged above said buckets, and each consisting of a valve shell or case having side openings near its base, and a valve-piston working in said shell, said bucket-chain being furnished with projections for operating said valve-piston, substantially as specified.

11. The combination, with a pair of vertically-moving weighing-buckets and a chain for operating said buckets, of a pair of filling-valves arranged above said buckets, and each consisting of a valve shell or case having side openings near its base, and a valve-piston working in said shell, said valve-piston operating by its own gravity in one direction, and said chain being provided with projections for raising said valve-pistons and opening said valves when said buckets are in turn brought to their filling positions, substantially as specified.

12. The combination, with weighing-buckets B B, of chain D, pulley E, hopper or grain-receptacle G, bottom G', having grain-discharge openings $g'$, valve-shells H H, having ports $h\,h$ near their base, and pistons H' H', said chain D being formed with projections $d\,d$, for operating said valve-pistons, substantially as specified.

13. The combination of weighing-buckets B B, chain D, having projections $d\,d$, pulley E, having notches $e\,e$, bent scale-beams F F, having pawls $f\,f$, filling hopper or receptacle G, valve shell or case H, having side openings, $h$, and pistons H', operated by said projections on said chain, substantially as specified.

14. The combination of weighing-buckets B B, chain D, having projections $d\,d$, pulley E, having notches $e\,e$, bent scale-beams F F, having pawls $f\,f$, filling hopper or receptacle G, valve shell or case H, having side openings, $h$, and pistons H', operated by said projections on said chain, said buckets B B each having a discharge-valve consisting of a valve shell or case, $b^2$, having side openings, $b^3$, and a piston, $b^4$, substantially as specified.

15. The combination of weighing-buckets B B, chain D, having projections $d\,d$, pulley E, having notches $e\,e$, bent scale-beams F F, having pawls $f\,f$, filling hopper or receptacle G, valve shell or case H, having side openings, $h$, and pistons H', operated by said projections on said chain, said buckets B B each having a discharge-valve consisting of a valve shell or case, $b^2$, having side openings, $b^3$, and a piston, $b^4$, and a fixed stop, $b^5$, for raising said valve-piston $b^4$ by the descent of said bucket, substantially as specified.

CYRENIUS DOMINY.

Witnesses:
H. M. MUNDAY,
LEW E. CURTIS.